United States Patent
Mahe

(10) Patent No.: US 9,713,338 B2
(45) Date of Patent: Jul. 25, 2017

(54) MULTI-TEXTURED ANIMAL TREATS

(75) Inventor: Yannick Mahe, Amiens (FR)

(73) Assignee: NESTEC SA, Vevey (CH)

( * ) Notice: Subject to any disclaimer, the term of this patent is extended or adjusted under 35 U.S.C. 154(b) by 0 days.

(21) Appl. No.: 14/238,314

(22) PCT Filed: Sep. 29, 2011

(86) PCT No.: PCT/US2011/001685
§ 371 (c)(1),
(2), (4) Date: Feb. 11, 2014

(87) PCT Pub. No.: WO2013/025183
PCT Pub. Date: Feb. 21, 2013

(65) Prior Publication Data
US 2014/0186276 A1    Jul. 3, 2014

Related U.S. Application Data

(60) Provisional application No. 61/575,077, filed on Aug. 15, 2011.

(51) Int. Cl.
| A23K 50/40 | (2016.01) |
| A23K 1/00 | (2006.01) |
| A01K 15/02 | (2006.01) |
| A23K 40/20 | (2016.01) |
| A23K 40/30 | (2016.01) |
| A23K 50/42 | (2016.01) |

(52) U.S. Cl.
CPC ............ *A23K 1/004* (2013.01); *A01K 15/026* (2013.01); *A23K 40/20* (2016.05); *A23K 40/30* (2016.05); *A23K 50/42* (2016.05)

(58) Field of Classification Search
CPC .................................................. A23K 50/42
See application file for complete search history.

(56) References Cited

U.S. PATENT DOCUMENTS

| 4,006,266 A | 2/1977 | Bone |
| 4,284,652 A | 8/1981 | Christensen |
| 4,900,572 A | 2/1990 | Repholz |

(Continued)

FOREIGN PATENT DOCUMENTS

| CN | 1828879 | 9/2006 |
| EP | 2744352 | 6/2014 |

(Continued)

OTHER PUBLICATIONS

Purina Busy Dental (http://www.amazon.com/Purina-Busy-Bone-Dental-Formula/dp/B000VC872U/ref=cm_cr_pr_product_top?ie=UTF8, accessed Oct. 30, 2015).*
Purina Busy Dental Reviews (http://www.amazon.com/Purina-Busy-Bone-Dental-Formula/dp/B000VC872U/ref=cm_cr_pr_product_top?ie=UTF8, accessed Oct. 30, 2015).*
Kong Dental Stick Dog Toy (http://www.amazon.com/KONG-Dental-Stick-Dog-Large/dp/B0002DHO0E/ref=cm_cr_pr_product_top?ie=UTF8, accessed Oct. 30, 2015).*

(Continued)

*Primary Examiner* — Benjamin Packard

(57) ABSTRACT

The invention provides multi-textured animal treats and methods for making the multi-textured animal treats. In a general aspect, the multi-textured animal treat includes one or more soft component comprising a mechanical joint that is wrapped around a hard component fixedly attached to the mechanical joint on the soft component. The soft component can include a mechanical joint alone or a combination of edible adhesives and a mechanical joint for providing an additional attachment mechanism to the hard component.

20 Claims, 1 Drawing Sheet

(56) References Cited

U.S. PATENT DOCUMENTS

| | | |
|---|---|---|
| 5,456,934 A | 10/1995 | Lee et al. |
| 6,312,746 B2 | 11/2001 | Paluch |
| 6,896,924 B2 | 5/2005 | Hernandez |
| 2003/0228400 A1* | 12/2003 | Dahl et al. .................... 426/282 |
| 2004/0052906 A1* | 3/2004 | Hernandez et al. ............ 426/89 |
| 2004/0086616 A1* | 5/2004 | Nie ........................ A23K 1/003 |
| | | 426/549 |
| 2006/0188611 A1* | 8/2006 | Unlu et al. ...................... 426/89 |
| 2007/0044730 A1* | 3/2007 | Axelrod ............... A01K 15/026 |
| | | 119/709 |
| 2007/0212456 A1 | 9/2007 | Axelrod |
| 2009/0004328 A1 | 1/2009 | Weinberg |
| 2009/0110778 A1 | 4/2009 | Muscroft |
| 2009/0157950 A1 | 6/2009 | Selinger |
| 2010/0224138 A1 | 9/2010 | Axelrod |

FOREIGN PATENT DOCUMENTS

| | | |
|---|---|---|
| JP | H05255055 | 10/1993 |
| JP | 2002-524062 | 8/2002 |
| JP | 2005-538715 | 12/2005 |
| JP | 2006-223308 | 8/2006 |
| WO | 2009157950 | 12/2009 |
| WO | 2013025183 | 2/2013 |

OTHER PUBLICATIONS

European Search Report to Application No. 11870841.1 dated May 30, 2014.
International Search Report and Written Opinion to Application No. PCT/US11/01685 dated Feb. 14, 2012.

* cited by examiner

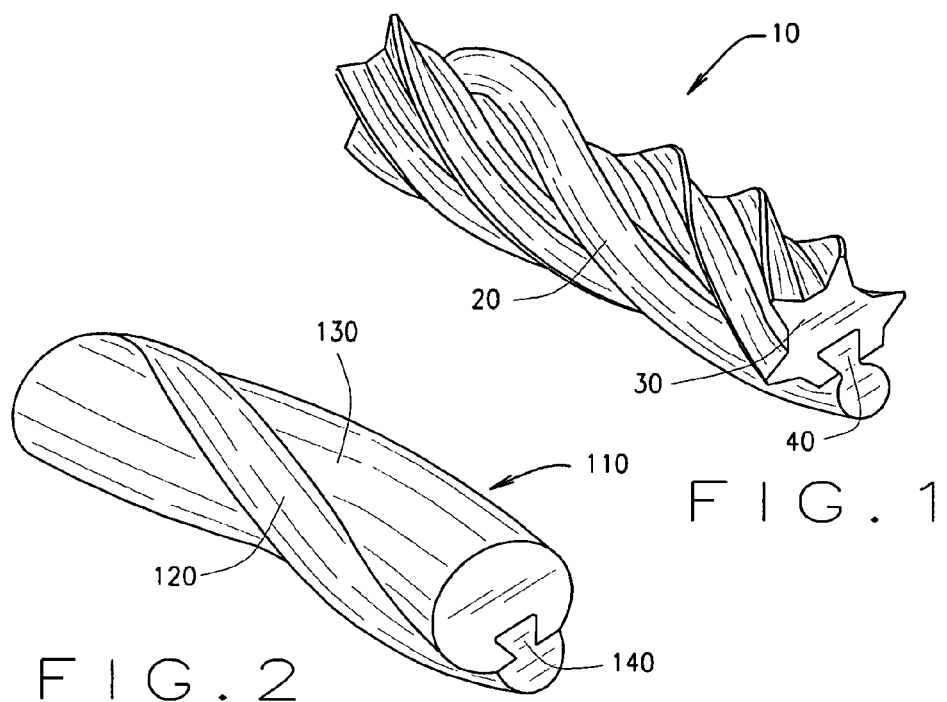
FIG. 1
FIG. 2
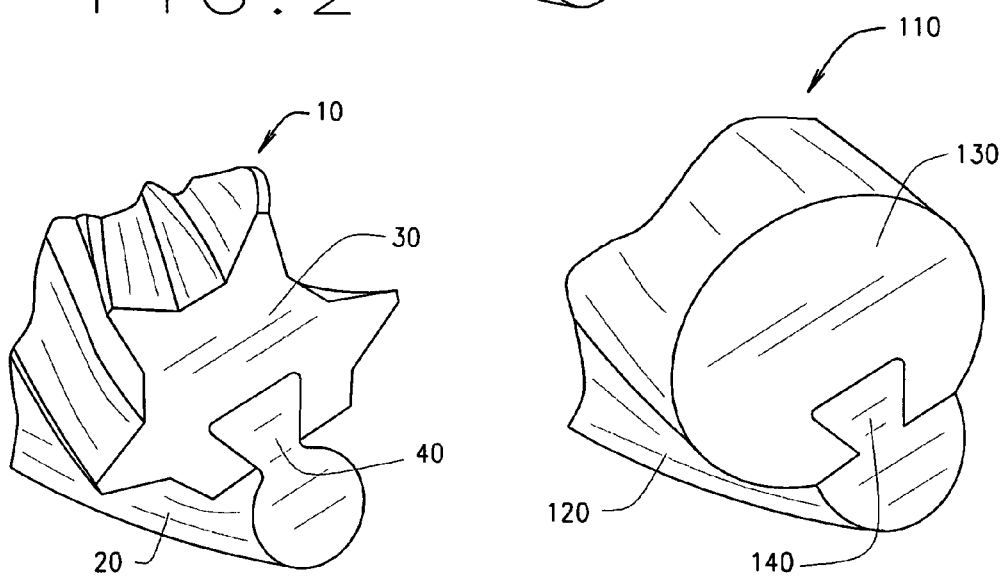
FIG. 3A
FIG. 3B

MULTI-TEXTURED ANIMAL TREATS

CROSS REFERENCE TO RELATED APPLICATIONS

This application is a national stage application under 35 USC §371 of PCT/US2011/001685 filed on 29 Sep. 2011 and claims priority to U.S. Provisional Application No. 61/575,077 filed 15 Aug. 2011, the disclosures of which are incorporated herein by this reference.

BACKGROUND OF THE INVENTION

Field of the Invention

The invention relates generally to multi-textured animal treats and particularly to multi-textured animal treats having different textural components that stay together for an extended period.

Description of Related Art

There are many pet food products on the market. The pet food products can be in a variety of shapes and structures such as kibbles, biscuits, rawhide products and meat emulsion products. Typically, these pet food products are homogenous in that they are usually made from the same materials throughout the product. Even pet food products that appear to be made from different base materials are usually made by providing the same base materials with different colors so as to give the pet food products a multi-component appearance.

The pet food products can be in a soft, hard or chewy form to achieve a variety of different objectives. Hard or chewy pet food products can be used to provide healthy and strong teeth in pets as they are chewed. However, the textures of many hard and chewy pet food products are often unappealing and unpalatable. For example, extruded dry pet foods are typically provided in hard lumps and have a dry, dusty appearance. Soft pet food products may be used to supply a specific nutritional component in a more readily palatable form, but do not promote strong teeth in the pets to the same extent that hard pet food products do. Providing a single pet food piece having a soft and hard component can overcome these problems.

Although hard pet food components and soft pet food components may be sold together as separate pieces (e.g., kibbles and bits), there are no satisfactory multi-textured pet food products formed entirely in one piece currently on the market. This arises because the hard pet food component and the soft pet food component are usually made from different materials that will not remain attached to each other for long periods of time without the two components becoming unstable and separating from each other. When this happens, it defeats the purpose of making a single multi-textured pet food product in the first place.

SUMMARY OF THE INVENTION

It is, therefore, an object of the invention to provide multi-textured animal treats having a hard component and at least one soft component that does not separate from the hard component for an extended period, e.g., about 12 months.

It is another object of the invention to provide multi-textured animal treats having a hard component that provides resistance to an animal's teeth to provide a brushing effect on the surface of the teeth.

It a further object of the invention to provide multi-textured animal treats that provides a delivery vehicle for functional ingredients needed for a healthy pet or other animal.

It is another object of the invention to provide methods of making multi-textured animal treats having a hard component and at least one soft component.

These and other objects are achieved using multi-textured animal treats having a hard component and at least one soft component. The soft component(s) are attached to the hard component mechanically via the use of a corresponding mechanical joint on the soft component(s). In addition to the mechanical joint, the soft component(s) can be further attached to the hard component using an edible adhesive.

Additional and further objects, features, and advantages of the invention will be readily apparent to those skilled in the art.

BRIEF DESCRIPTION OF THE DRAWINGS

FIG. 1 shows a front perspective view of a multi-textured animal treat in an embodiment of the invention.

FIG. 2 shows a front perspective view of a multi-textured animal treat in a second embodiment of the invention.

FIG. 3A shows an enlarged end view of FIG. 1 of the invention.

FIG. 3B shows an enlarged end view of FIG. 2 of the invention.

DETAILED DESCRIPTION OF THE INVENTION

Definitions

The term single package means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual multi-textured animal treats and other components physically associated such that they are considered a unit for manufacture, distribution, sale, or use.

The term virtual package means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact a caregiver or instructor to obtain instructions on how to use the kit or safety or technical information about one or more components of a kit.

All percentages expressed herein relating to the components of a composition are by weight of the total weight of the composition unless expressed otherwise.

As used throughout, ranges are used herein in shorthand, so as to avoid having to set out at length and describe each and every value within the range. Any appropriate value within the range can be selected, where appropriate, as the upper value, lower value, or the terminus of the range.

As used herein and in the appended claims, the singular form of a word includes the plural, and vice versa, unless the context clearly dictates otherwise. Thus, the references a, an, and the are generally inclusive of the plurals of the respective terms. For example, reference to a multi-textured animal treat or a method includes a plurality of such multi-textured animal treats or methods. Similarly, the words comprise, comprises, and comprising are to be interpreted inclusively rather than exclusively. Likewise, the terms include, including, and or should all be construed to be inclusive, unless such a construction is clearly prohibited from the context. Where used herein the term examples, particularly when followed by a listing of terms is merely exemplary and illustrative, and should not be deemed to be exclusive or comprehensive.

The products, methods, compositions, and other advances disclosed here are not limited to particular methodology, protocols, and ingredients described herein because, as the skilled artisan will appreciate, they may vary. Further, the terminology used herein is for the purpose of describing particular embodiments only, and is not intended to, and does not, limit the scope of that which is disclosed or claimed.

The Invention

In one aspect illustrated in FIG. 1, the invention provides a multi-textured animal treat 10 having a soft component 20 comprising a mechanical joint 40 and a hard component 30 fixedly attached to a corresponding mechanical joint 40 on the soft component. Hard component 30 has a hardness as measured by Instron compressibility values ranging from about 25 lb-f to about 60 lb-f (e.g., Instron 5500R) and more preferably from about 25 lb-f to about 55 lb-f or any value within the range. Soft component 20 has a hardness as measured by Instron compressibility values ranging from about 1 lb-f to about 20 lb-f (e.g., Instron 5500R) and more preferably from about 1 lb-f to about 15 lb-f or any value within the range. Multi-textured animal treat 10 can have any suitable length or thickness. As illustrated in FIG. 1, hard component 30 and soft component 20 can take the form of separate ropes or strands that interact with each other, the two components being held together by mechanical joint 40.

As further illustrated in FIG. 1, hard component 30 has a twisted shape. For example, the hexagonal shape of hard component 30 depicts ridges at the plane of the intersection of two adjacent sides to convey a scraping capability of treat 10 with oral health benefits. Hard component 30 also provides a section or groove for attaching to mechanical joint 40. Hard component 30 can have any suitable shape compatible with soft component 20, e.g., the hard component can be cylindrical, triangular, rectangular, hexagonal, octagonal, and the like.

Hard component 30 surrounds the protrusion on soft component 20 to form mechanical joint 40. As a result, hard component 30 is mechanically attached to soft component 20 via mechanical joint 40. This mechanical attachment prevents soft component 20 from coming detached from hard component 30 during an extended period, e.g., 1 week, 2 weeks, 1 month, 6 months, 12 months or longer, including during storage of multi-textured animal treat 10. An end view of multi-textured animal treat 10 is shown in FIG. 3A.

As used herein, a mechanical joint is a protrusion extending from the soft component by which the hard component can readily surround and maintain an attachment to the soft component. Mechanical joint 40 can be provided along part of or the entire length of soft component 20. Mechanical joint 40 can also be provided intermittently along the length of soft component 20. Hard component 30 can be placed over and attached to any suitable portion of mechanical joint 40 so that at least a portion or all of hard component 30 is fixedly attached to soft component 20. In addition to the triangular shape shown in FIG. 1, mechanical joint 40 can be in any suitable shape including a dovetail, hook, t-shape, arrow, and the like suitable for fixedly attaching hard component 30 to soft component 20. This description of mechanical joint 40 can apply to any embodiments of the multi-textured animal treat described herein and to multiple mechanical joints when the multi-textured animal treat has multiple soft components.

In another aspect, along with mechanical joint 40, hard component 30 can be further attached to soft component 20 using an edible adhesive, e.g., sodium caseinate and/or gelatine. The adhesion of soft component 20 to hard component 30 is enhanced by providing a large surface area via mechanical joint 40 at the interface of the components. The adhesive can be added to soft component 20 during manufacturing. Alternatively, the adhesive can be added to hard component 30 or to both soft component 20 and hard component 30 during manufacturing. During the stage when soft component 20 contains a substantial amount of moisture and is wrapped around hard component 30, the sodium caseinate/gelatine acts as an adhesive and causes soft component 20 to fixedly be attached to hard component 30 when the two components are extruded and dried. The description of mechanical joint 40 with adhesive can apply to any embodiments of the multi-textured animal treat described herein that use adhesives and to multiple mechanical joints when the multi-textured animal treat has multiple soft components.

In addition to or in place of sodium caseinate/gelatine, the adhesive can be from one or more maltodextrins, flours (e.g., pre-cooked/toasted flours), starches, animal proteins, vegetable proteins or combinations thereof. Suitable animal proteins include plasma and blood. Suitable vegetable proteins include pea protein, corn protein (e.g., ground corn or corn gluten), wheat protein (e.g., ground wheat or wheat gluten), soy protein (e.g., soybean meal, soy concentrate, or soy isolate), rice protein (e.g., ground rice or rice gluten) and the like. These vegetable proteins may be provided in the form of meals, flours, concentrates, and isolates as desired.

The adhesive can be used in any suitable amount to provide sufficient adhesion for the soft component to remain fixedly attached to the hard component. In an embodiment, the adhesive can be sodium caseinate ranging from about 0.1% to about 10% including about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% and the like. In an embodiment, the adhesive can be gelatine (e.g., ≥100 Bloom) at ranging from about 1% to about 15% including about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5% and the like. It should be appreciated that this description of the adhesive(s) can apply to any embodiments of the multi-textured animal treat described herein.

In another aspect illustrated in FIG. 2, the invention provides a multi-textured animal treat 110 having a soft component 120 including a mechanical joint 140 and a hard component 130 fixedly attached to mechanical joint 140, alone or in combination with an adhesive. Hard component 130 has a hardness as measured by Instron compressibility values ranging from about 25 lb-f to about 60 lb-f (e.g., Instron 5500R) and more preferably from about 25 lb-f to about 55 lb-f or any value within the range. Soft component 120 has a hardness as measured by Instron compressibility values ranging from about 1 lb-f to about 20 lb-f (e.g., Instron 5500R) and more preferably from about 1 lb-f to about 15 lb-f or any value within the range. Multi-textured animal treat 110 can have any suitable length or thickness.

As further illustrated in FIG. 2, hard component 130 has a cylindrical shape and has a groove that surrounds mechanical joint 140. Soft component 120 is wrapped around hard component 130 in a spiral shape. As a result, hard component 130 is mechanically attached to soft component 120 via mechanical joint 140. This mechanical attachment prevents soft component 120 from coming detached from hard component 130 during an extended period, including during storage of multi-textured animal treat 110. In another aspect, along with the mechanical joint, soft component 120 can be attached to hard component 130 by using an adhesive as described herein. An end view of multi-textured animal treat 110 is shown in FIG. 3B.

The hard component can been formulated to provide sufficient resistance to a dog's biting of the multi-textured animal treat, which will induce a brushing effect on the dog's teeth surface. In any aspects of the multi-textured animal treats of the invention, the hard component can be a starch-based extruded product. The hard component can also be a pregelatinized cereal grain such as, for example, corn, wheat, barley, millet, sorghum, oat, rye, triticale or a combination thereof.

In an embodiment, the hard component can be a bio-plastics material produced from an expanded material as described in U.S. Patent Publication No. 2006/0292288. The bio-plastics material may be produced by a method that includes thermally treating a pre-expanded (e.g., porous) dry constituent so as to melt it. Preferably, cooking the pre-expanded dry constituent takes place in the presence of a component capable forming hydrogen bonds. The component can be a substance other than water. The component preferably is capable of solvating the constituent. The component may be a polyhydric solvent. This may be liquid or solid under standard temperature and pressure conditions. Examples of suitable liquid solvents are ethylene glycol, glycerol and propylene glycol. Examples of suitable solid polyhydric solvents are sugars and sorbitol. Water may be present.

The cooking of the pre-expanded dry constituent can be carried out preferably at low water activity and under low moisture conditions. Prior to the cooking, the pre-expanded constituent and the hydrogen bond-forming component, when used, are preferably mixed together to form a substantially homogeneous mixture, which is then disposed in a cooking vessel. Preferably, the mixture includes from 10% to about 90% by weight of the constituent and more preferably from 40% to about 80% by weight. Preferably, the mixture includes from about 0% to about 50% water by weight. Further preferably, the mixture includes from about 1% to about 15% water by weight. Preferably, the mixture includes from about 0% to 80% by weight of the hydrogen bond-forming component. Further preferably, the mixture includes from about 4% to about 16% of the hydrogen bond-forming component by weight.

The mixture may further include from about 1% to 30% protein. The protein may be derived from a plant or animal source or both. It may be provided as a protein concentrate. Optional ingredients such as those conventionally selected for inclusion in food products may also be added to the mixture. Accordingly, the mixture may still further include at least one additional constituent such as, for example, gelatin, dicalcium phosphate, a nutrient mixture, a reactive sugar, an amino acid, high-amylose or amylopectin component (such as starch) and inert (or non-digestible) fillers.

The mixture may further include a preservative. Suitable examples include potassium sorbate, sorbic acid, methyl para-hydroxybenzoate, calcium propionate and propionic acid. As water activity decreases, the need (if any) for such preservatives diminishes accordingly. Thus, where no water is added, no preservative is strictly needed. The presence, in preferred embodiments, of a hydrogen bond-forming component in combination with the pre-expanded constituent contained in the mixture, while requiring the input of substantial amounts of energy in the cooking, nevertheless promotes controlled transformation of the constituent into a stable, coherent and digestible foodstuff body that can form a hard component that has a desired texture and unique properties by design.

Using pre-expanded particles provides an advantage over unexpanded particles because the pre-expanded particles are highly porous and have a higher number of micro-pores of a size greater than ten times the average molecular radius of the chosen hydrogen bond forming component, for example a polyhydric solvent. Consequently, the pre-expanded particles have a larger external surface area to volume ratio, compared to unexpanded particles. The external surface area includes all surfaces accessible to molecules of the solvent, including surfaces within the pores, micro-pores and intra-particular tunnels. The pre-expanded particles are found to have a much faster absorption rate for the polyhydric solvent, compared to unexpanded prior art particles. The pre-expanded particles also have a much faster adsorption of polyhydric solvents compared to prior art particles. The pre-expanded particles further have a much faster rate of solvation with a polyhydric solvent compared to prior art particles.

In addition to the hard component, the soft component can include a preservative. In addition, at least one of the hard component and the soft component can include additional ingredients such as, for example, drugs, nutrients, herbs, oral care ingredients, visible nutrition ingredients, colorants, flavorants, humectants, antioxidants, or a combination thereof.

The oral care ingredients can be any ingredient that improves oral health. Typical oral care ingredients include those that freshen breath, control tartar, combat gingivitis, combat periodontitis, and the like. The oral care ingredients can be in the multi-textured animal treat in an amount ranging from about 0.05% to about 2.5%. Suitable oral care ingredients include alfalfa nutrient concentrate (contains chlorophyll), sodium bicarbonate, phosphates (e.g., tricalcium phosphate, acid pyrophosphates, tetrasodium pyrophosphate, metaphosphates, orthophosphates), peppermint, cloves, parsley, ginger, and the like.

The visible nutrition ingredients can be in the form of pieces or specks on the surfaces and/or within the hard component or soft component. The visible nutrition ingredients can be in the multi-textured animal treat in an amount ranging from about 0.1% to about 0.8%. Suitable visible nutrition ingredients include corn germ meal, dehydrated vegetables, fruits, grains (e.g., spinach, carrots, cranberry), and the like.

The colorants can provide an aesthetic effect. The colorants can be in the multi-textured animal treat in an amount ranging from about 0.001% to about 0.8%. Suitable colorants include FD & C colors, natural colors, titanium dioxide, and the like. In various embodiments, the melt and the dough are different colors.

The flavorants can make the multi-textured animal treat more palatable for the animal. The flavorants can be in the multi-textured animal treat in an amount ranging from about 0.03% to about 8%, preferably from about 0.05 to about 5%, more preferably from about 0.1 to about 4%. Suitable flavorants include yeast, tallow, rendered animal meals (e.g., poultry, beef, lamb, and pork), flavor extracts or blends (e.g., grilled beef), and the like.

The humectants affect the texture of the multi-textured animal treats and provide an aesthetic effect on the multi-textured animal treats. The humectants can be in the multi-textured animal treat in an amount ranging from about 9% to about 31%, preferably from about 11 to about 24%. Suitable humectants include salt, sugars, propylene glycol and polyhydric glycols such as glycerin and sorbitol, and the like.

The antioxidants can provide an aesthetic effect and influence the odor of multi-textured animal treats, particularly during extended shelf-life. The antioxidants can be in the multi-textured animal treat in an amount ranging from about 0.01% to about 0.5%. Suitable antioxidants include BHA/BHT, vitamin E (tocopherols), and the like.

In general, any ingredient that is compatible with the hard component and/or soft component can be added to the component. For example, pharmaceuticals, nutraceuticals, drugs, herbs, nutrients, or other ingredients that prevent disease, treat disease, ameliorate disease symptoms, or affect one or more bodily functions can be added to one or more of the components where applicable, e.g., unsaturated fatty acids (UFA); nitric oxide releasing compounds (NORC); anti-glycation agents; colostrum; amino acids; proteins; peptides; polypeptides; nucleic acids; oligonucleotides; polynucleotides; small molecules; macromolecules; vitamins; minerals; simple sugars; complex sugars; polysaccharides; carbohydrates; medium-chain triglycerides (MCTs); triacylglycerides (TAGs); n-3 (omega-3) fatty acids such as DHA, EPA, and ALA; n-6 (omega-6) fatty acids such as LA, γ-linolenic acid (GLA) and ARA, SA, and conjugated linoleic acid (CLA); choline or choline sources such as lecithin; fat-soluble vitamins such as vitamin A and precursors thereof such as carotenoids (e.g., (β-carotene); vitamin D sources such as vitamin D2 (ergocalciferol) and vitamin D3 (cholecalciferol); vitamin E sources such as tocopherols (e.g., α-tocopherol) and tocotrienols and vitamin E derivatives such as trolox; and vitamin K sources such as vitamin K1 (phylloquinone) and vitamin K2 (menadione); water-soluble vitamins such as B vitamins such as riboflavin; niacin (including nicotinamide and nicotinic acid); pyridoxine; pantothenic acid; folic acid; biotin; cobalamin; vitamin C (ascorbic acid); antioxidants including some of the vitamins listed above, especially vitamins E and C; bioflavonoids such as apigenin, catechin, flavonone, genistein, naringenin, quercetin and theaflavin; quinones such as ubiquinone; carotenoids such as lycopene and lycoxanthin; α-lipoic acid; L-carnitine; D-limonene; glucosamine; S-adenosylmethionine; chitosan; alginate; calcium; hyaluronic acid; magnesium; monooleylphosphatidic acid; nitric oxide (e.g., as nitroglycerin); S-carbamylcysteine; sodium butyrate; sodium salicylate; spermidine; sphingosine; and glucose. Other examples include ingredients that affect joint conditions or disease such as analgesics, glucosamine, chondroitin, non-steroidal anti-inflammatory drugs, chondroitin sulfate, and glucosamine sulfate. Other examples include immune system enhancing agents such as calcineurin inhibitors, glucocorticoids, and the like. Similarly, these and the above mentioned ingredients can be added to the hard component or soft component in various combinations when compatible with the components and each other, e.g., one or more oral care ingredients and one or more ingredients that affect joint conditions or disease in the same hard component or in the same soft component.

Similarly, the multi-textured animal treat can act as a delivery vehicle for numerous individual functional ingredients. For instance, one component may have a functional ingredient related to oral health while the other component may have an ingredient beneficial for joint health or gut health. In addition, by providing separate delivery vehicles via the hard and soft components, the multi-textured animal treat can carry ingredients that might adversely react with one another if they are in the same component.

In another aspect, the invention provides packages useful for containing multi-textured animal treats of the invention. The packages comprise at least one material suitable for containing the multi-textured animal treats and a label affixed to the material containing a word or words, picture, design, acronym, slogan, phrase, or other device, or combination thereof, that indicates that the package contains the multi-textured animal treat. Typically, such device comprises the words multi-textured animal treat or multi-textured animal treat having a hard and a soft component or an equivalent expression printed on the material that distinguishes the multi-textured animal treat of the invention. Any package configuration and packaging material suitable for containing the multi-textured animal treat are useful in the invention, e.g., a bag, box, sachet, bottle, can, pouch, and the like manufactured from paper, plastic, foil, metal, and the like. In preferred embodiments, the package further comprises one or more multi-textured animal treats of the invention. In various embodiments, the package further comprises at least one window that permit the package contents to be viewed without opening the package. In some embodiments, the window is a transparent portion of the packaging material. In others, the window is a missing portion of the packaging material. The multi-textured animal treats have a hard component and a soft component fixedly attached to the hard component. The soft component remains fixedly attached to the hard component without separating for at least 8 weeks, 10 weeks, 12 weeks, 6 months, 12 months or longer.

In another aspect, the invention provides a method of making a multi-textured animal treat. The method comprises mixing a dry blend of components for a hard component with plasticizers in the extruder to form a first melt and mixing a dry blend of components for a soft component with plasticizers which are heated and mixed to form a dough. The first melt and the heated dough are coextruded through a die assembly to form the multi-textured animal treat. The dough forms an elongated rope having at least one protrusion, preferably a protrusion on one side of the rope. The first melt encases the protrusion and forms a mechanical joint prior to exiting the die assembly. The extruded hard component can have a twisted shape or a cylindrical shape. The soft component can be wrapped around the hard component in a spiral shape.

Generally, a hard component and one or more soft components are co-extruded and held together by mechanical or physical means as described herein, e.g., a mechanical joint.

In various embodiments, the invention provides multi-textured animal treats having a hard component (illustrated as 30 in FIG. 1) having two or more grooves suitable for encasing one or more mechanical joints (one such mechanical joint illustrated as 40 in FIG. 1 and FIG. 3A) and two or more soft components (one such soft component illustrated as 20 in FIG. 1 and FIG. 3A) having a mechanical joint useful (illustrated as 40 in FIG. 1 and FIG. 3A) for fixedly attaching to the hard component. In one embodiment, the hard component has two soft components fixedly attached via a corresponding mechanical joint on the soft component, i.e., the hard component has two grooves that attach to corresponding mechanical joints on the soft component. In another, the hard component has three soft components fixedly attached to a corresponding mechanical joint on a corresponding soft component. In others, the hard component has four or more soft components fixedly attached to a corresponding mechanical joint on a corresponding soft component, the upper limit of soft components being dictated by the size of the hard component and the soft components.

The soft components can comprise the same ingredients or different ingredients, e.g., the ingredients given herein such as oral care ingredients, visible nutrition ingredients, colorants, flavorants, humectants, antioxidants, and combinations thereof. Similarly, the soft components can have the same or different size, shape, appearance, and texture. Varying these characteristics of the soft components permits the multi-textured animal treat to be customized as needed to meet the aesthetic, health, hedonistic, or other needs or various animals and, when applicable, their caregivers. For example, in certain embodiments the soft components contain different flavorants that vary the taste of the multi-textured animal treat; different ingredients that vary the texture of the multi-textured animal treat; and different colorants that vary the color of the multi-textured animal treat. In one embodiment, the multi-textured animal treat has two soft components, one containing one or more oral care ingredients and one containing one or more flavorants. This embodiment provides a flavorful treat that is desirable to the animal and that has a beneficial effect on oral health. In another, the multi-textured animal treat has two soft components, one containing one or more compounds that benefit joint health and one containing one or more different ingredients, e.g., flavorants, colorants, and the like. In another, the multi-textured animal treat has two soft components, one containing one or more flavorants and one containing one or more different flavorants. This embodiment provides a multi-flavorful treat that typically has enhanced appeal to the animal. In another, the multi-textured animal treat has two soft components, one containing one or more flavorants and one containing one or more antioxidants. This embodiment provides a flavorful treat that has a beneficial effect on animal health. In another, the multi-textured animal treat has two soft components, one containing one or more flavorants and one containing one or more medications. This embodiment provides a flavorful treat that the animal will desire and consume while taking needed medications without the difficulties that often accompany administering medications to animals. In a further, the multi-textured animal treat has three soft components, one containing flavorants and colorants; one containing oral health ingredients, and one containing antioxidants. Numerous such combinations can be prepared by the skilled artisan. Treats containing two or more soft components are made using the same methods described herein except that the two or more soft components are coextruded during the process. In certain other embodiments, the soft components have different sizes and/or shapes. Varying these characteristics of the soft components permits the multi-textured animal treat to be varied as needed to meet the aesthetic, manufacturing requirements, or other needs of manufacturers, animals and, when applicable, their caregivers. For example, when manufacturing a multi-textured animal treat with four soft components (often having different palatants, colorants, and the like), the soft components may need to have a smaller size so that the multiple soft components can be accommodated on the hard component while keeping the overall size of the multi-textured animal treat such that it is appealing to and/or can be consumed by the animal, e.g., mouth size and bite size compatible. Similarly, the shape of the soft components can be varied simply to create a visually appealing treat. For example, a multi-textured animal treat having three soft components can have one soft component in the shape of a star, one soft component in shape of a circle, and one soft component in shape of a triangle. Numerous combinations of shapes, sizes, flavorants, colorants, and the like are envisioned and are included within the invention.

In various embodiments, the multi-textured animal treat comprises a combination of soft components fixedly attached individually to the hard component using one or more mechanical joints and one or more edible adhesives, as the mechanical joints and adhesives are described herein.

In other embodiments, an individual soft component is fixedly attached to the hard component using a combination of one or more sections of mechanical joint and one or more sections of edible adhesive, e.g., one-half of an individual soft component is attached to the hard component using a mechanical joint and the other half of the soft component is attached to the hard component using edible adhesive or one-fourth of an individual soft component is attached to the hard component using a mechanical joint and one-third of the remaining soft component is attached to the hard component using edible adhesive. In some of these embodiments, there are one or more sections of the soft component that are not fixedly attached to the hard component.

In another aspect, the invention provided animal treats made according to the methods of the invention.

Various ingredients in various amounts can be used to make the multi-textured animal treats of the invention. Examples of such ingredients and ranges for such ingredients are:

| | Preferred Ranges |
|---|---|
| Hard Component Formulations | |
| Pregelatinized Rice Flour | Level varies with other components (60.0%-86.0%) |
| Emulsifier | 1.2-2.0% |
| Potassium sorbate | 0.2-0.6% |
| Calcium propionate | 0.2-0.6% |
| Glycerin | 8.0-20.0% |
| Water | 4.0-15.0% |
| Phosphoric acid | 0.4-1.0% |
| Soft Component Formulations | |
| Wheat Flour | Level varies with other components (30.0-80.0%) |
| Pregelatinized corn flour | 0.0-20% |
| Sugar | 0.0-15% |
| Glycerin | 15.0-25.0% |
| Water | 4.0-15.0% |
| Potassium sorbate | 0.2-0.6% |
| Calcium propionate | 0.2-0.6% |
| Phosphoric Acid | 0.4-1.0% |
| Total Product Formulations | |
| Cereal/Starch Matrix | |
| Pregelatinized starches | Level varies with other components (45.0-71.0%) |
| Wheat Flour | 8.0-18.0% |
| Plasticizers-Humectants | |
| Polyols | 10.0-25.0% |
| Sugar/Salt | 2.0-5.0% |
| Water | 8.0-15.0% |
| Antimycotic Preservatives | |
| Potassium sorbate | 0.2-0.6% |
| Calcium Propionate | 0.2-0.6% |
| Phosphoric Acid | 0.4-1.0% |

In a further aspect, the invention provides kits. The kits comprise in separate containers in a single package or in separate containers in a virtual package, as appropriate for the kit component, at least one multi-textured animal treat of the invention and one or more of (1) one or more comestible ingredients, e.g. different treats, dog foods, cat foods, animal toys, and the like; (2) one or more devices useful for entertaining an animal, e.g., a play toy, a chew toy, and the like; (3) one or more devices useful for managing or protecting an animal, e.g., a piece of clothing, a leash, a collar, and the like; and (4) instructions for how to use the animal treats and other kit components, particularly for the benefit of the animal.

When the kit comprises a virtual package, the kit is limited to instructions in a virtual environment in combination with one or more physical kit components. The kits may contain the kit components in any of various combinations. In one embodiment, the kit contains a multi-textured animal treat of the invention and a container of food for consumption by an animal, e.g., dog food or cat food. In another, the kit contains the animal treat and an inedible chew toy. In another, the kit contains the animal treat and a animal collar and a corresponding leash. Numerous such combinations are within the purview of the skilled artisan.

In another aspect, the invention provides packages useful for containing multi-textured animal treats of the invention. The package comprises at least one material suitable for containing the animal treat and a label affixed to the material containing a word or words, picture, design, acronym, slogan, phrase, or other device, or combination thereof, that indicates that the package contains the animal treat. Typically, such device comprises the words multi-textured animal treat or long lasting multi-textured animal treat or an equivalent expression printed on the material. Any package configuration and packaging material suitable for containing the animal treat are useful in the invention, e.g., a bag, box, bottle, can, pouch, and the like manufactured from paper, plastic, foil, metal, and the like. In preferred embodiments, the package further comprises a animal treat of the invention. In various embodiments, the package further comprises at least one window that permit the package contents to be viewed without opening the package. In some embodiments, the window is a transparent portion of the packaging material. In others, the window is a missing portion of the packaging material.

In another aspect, the invention provides a means for communicating information about or instructions for one or more of (1) instruction for using multi-textured animal treats of the invention, particularly to entertain or benefit an animal, and (2) using the kits of the present invention. The means comprises a document, digital storage media, optical storage media, audio presentation, or visual display containing the information or instructions. In certain embodiments, the communication means is a displayed web site, visual display, kiosk, brochure, product label, package insert, advertisement, handout, public announcement, audiotape, videotape, DVD, CD-ROM, computer readable chip, computer readable card, computer readable disk, computer memory, or combination thereof containing such information or instructions. Useful information includes contact information for animals or their caregivers to use if they have a question about the multi-textured animal treats of the kits.

EXAMPLES

By way of example and not limitation, the following examples are illustrative of various embodiments of the present disclosure. The examples describe formulations for the hard and soft components and the method of linking them to form a multi-textured twisted product that stays together through the product shelf life.

Example 1

Hard Component

One thousand kilograms (kgs) of dry mix for the hard component was prepared by weighing each ingredient as shown in Table 1 and adding to a ribbon mixer where they were mixed to form a homogeneous dry blend.

The dry blend was then transferred to a hopper that feeds a first twin screw extruder EV68 (TSE 1). The screws were configured for medium shear and a vent stuffer was assembled on barrel 6 (over 10) of the extruder.

After extruder start-up, the dry blend was fed into the first barrel of the extruder at 154 kg/h. The slurry Glycerin 86 (96%)/phosphoric acid 75% (4%) that was heated to 60° C. was injected into this barrel at 26.5 kg/h (17.2% of the dry mix feed rate). Water was also injected into this section at 20.5 kg/h (13.3% of the blend feed rate). The screw speed was adjusted at 170 rpm. The pressure at the front plate was around 100 bars. The barrels were all cooled down thanks to chilled water to keep the temperature of the dough below 100° C. This melt was pushed through the manifold attached to the end of the extruder. The manifold led to the 4 rotating dies.

TABLE 1

| Hard Component Dry Mix Formulation | |
|---|---|
| Ingredients | % |
| Pregelatinized Rice Flour | 86.81 |
| Distilled Monoglyceride | 1.70 |
| BHT Powder | 0.02 |
| Dried Brewer Yeasts | 3.00 |
| Wheat common (ground) | 2.58 |
| Vitamin & Mineral Premix | 1.30 |
| Calcium hydrogen Phosphate | 2.50 |
| Potassium Sorbate | 0.60 |
| Calcium Propionate | 0.40 |
| Titanium Dioxide | 0.40 |
| Meat Bacon Flavor 1 | 0.56 |
| Meat Bacon Flavor 2 | 0.13 |
| Total | 100.00 |

Example 2

Soft Component

Two hundred sixty (260) kilograms (kg) of dry blend for the soft component was made by weighing ingredients as shown in Table 2 into a ribbon mixer where they were mixed to form a homogeneous dry blend.

The dry blend was then transferred to a hopper that feeds a second twin screw extruder BC45 (TSE 2) of lower capacity. The screws were configured for medium shear.

After extruder start-up, the dry blend was fed into the first barrel of the extruder at 40.5 kg/h. The slurry Glycerin 86 (96%)/phosphoric acid 75% (4%) that was heated to 60° C. was injected into this barrel at 12.0 kg/h (29.6% of the dry mix feed rate). Water and Soya Oil was also injected into this section respectively at 5.7 kg/h (14.1% of the blend feed rate) and 3.3 kg/h (8.2% of the blend feed rate). The screw speed was adjusted at 320 rpm. The pressure at the front plate was around 100 bars. Some of the barrels were heated up to 55° C. to help gelatinizing the starch. This melt was then pushed through the second manifold connected to the end of the 2nd extruder. The manifold led to the 4 rotating dies where hard and soft component are combined, the hard and the soft component representing respectively circa 76% and 24% of the complete product.

TABLE 2

Soft Component Dry Mix Formulation

| Ingredients | % |
|---|---|
| Wheat Flour type 55 | 58.45 |
| Pregelatinized Corn Flour | 14.10 |
| Sugar | 9.96 |
| Glucosamine Sulphate | 6.00 |
| Calcium hydrogen Phosphate | 4.00 |
| Sodium Chloride | 3.00 |
| Vitamin & Mineral Premix | 1.30 |
| Potassium Sorbate | 0.74 |
| Calcium Propionate | 0.48 |
| Distilled Monoglyceride | 0.40 |
| Red Iron Oxide | 0.4 |
| Black iron Oxide | 0.25 |
| Yellow Iron Oxide | 0.07 |
| BHT powder | 0.02 |
| Meat Bacon Flavor 1 | 0.68 |
| Meat Bacon Flavor 2 | 0.15 |
| Total | 100.00 |

Example 3

Forming the Multi-Textured Twist Product

As shown in Example 1 (the hard extrudate) and Example 2 (the soft extrudate) were both formed separately and combined at the very end of the die assembly. As visible on the die drawings, the soft component die channel was designed to create a dovetail into the hard part die channel. Both extrudates are shaped separately nearly all the die long. The flow paths were brought in contact 10 mm before the die outlet. The bonded ropes were rotated as they exited the die assembly creating a braided structure. The twisting effect reinforced the bond between the 2 parts by closing the groove where the soft dovetail is entrapped. The twisted ropes were cut with an ultrasonic cutter in approximately either 70 mm, 110 mm or 140 mm inch pieces, depending of the die cross section used. The products are cooled down to 20° C. and stored before being packed in moisture barrier flexible bags. The product is shown in FIG. 1 and FIG. 3A. The products stored at ambient conditions showed that the hard and soft parts remained tightly bonded. Thanks to the respective initial Aw of the 2 parts, the textures remained hard and soft.

Example 4

Example 1 was repeated except that seventy-five percent (75%) of the pregelatinized rice flour of the hard component was replaced by pregelatinized corn flour. Texture measurements were done 4 weeks after production. The measurements showed that pregelatinized corn flour leads to slightly weaker texture compared to pregelatinized rice flour. The maximum traction force decreased from 446 Newtons down to 330 Newtons while the maximum penetrometry force decreased from 250 Newtons down to 215 Newtons.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, are relevant prior art for the present invention and the right to challenge the accuracy and pertinence of such patents, patent applications, publications, and other references is specifically reserved.

What is claimed is:

1. A multi-textured animal treat comprising:
   one or more soft components that each comprise a rope that is cylindrical or twisted and has a length, each of the one or more soft components comprising a mechanical joint that protrudes from the rope along at least part of the length of the rope, the soft components having a hardness as measured by Instron compressibility values ranging from about 1 lb-f to about 20 lb-f;
   a hard component comprising a groove and fixedly attached to a corresponding mechanical joint on the one or more of the soft components, the corresponding mechanical joint is inserted into the hard component such that the rope is positioned exterior to the groove and the corresponding mechanical joint is positioned interior to the groove, the hard component having a hardness as measured by Instron compressibility values ranging from about 25 lb-f to about 60 lb-f, the hard component is selected from the group consisting of (i) a starch-based extruded product and (ii) a composition comprising a pregelatinized cereal grain, and the hard component is further fixedly attached to the corresponding mechanical joint on the one or more soft components by an edible adhesive that is gelatin in an amount of 0.1 to 4.0 wt. % of the treat.

2. The multi-textured animal treat of claim 1 wherein the mechanical joint protrudes from the rope along the entire length of the rope for at least one of the one or more soft components.

3. The multi-textured animal treat of claim 1 wherein the mechanical joint protrudes from the rope intermittently along the length of the rope for at least one of the one or more soft components.

4. The multi-textured animal treat of claim 1 wherein at least one of the hard component and the one or more soft components comprises a preservative.

5. The multi-textured animal treat of claim 1 wherein at least one of the hard component and the one or more soft components comprises an additional ingredient selected from the group consisting of oral care ingredients, visible nutrition, colorants, flavorants, humectants, antioxidants and combinations thereof.

6. The multi-textured animal treat of claim 1 wherein the hard component has a twisted shape.

7. The multi-textured animal treat of claim 1 wherein each of the one or more soft components is wrapped around the hard component in a spiral shape.

8. The multi-textured animal treat of claim 1 wherein the gelatin is at least 100 Bloom edible adhesive.

9. The multi-textured animal treat of claim 1 wherein the gelatin is 0.5 to 3.0 wt. % of the treat.

10. The multi-textured animal treat of claim 1 wherein the gelatin is 1.0 to 2.0 wt. % of the treat.

11. The multi-textured animal treat of claim 1 wherein the one or more soft components comprise a plurality of soft components which each are fixedly attached individually to the hard component by a combination of one or more mechanical joints and one or more edible adhesives.

12. A method of making a multi-textured animal treat comprising:
mixing a dry blend of components for a hard component with plasticizers in an extruder to form a first melt, the dry blend comprising at least one of a starch or a pregelatinized cereal grain;
mixing a dry blend of components for a soft component with plasticizers to form a soft component blend;
mixing and heating the soft component blend to form a dough;
coextruding the first melt and the dough through a die assembly to form the multi-textured animal treat, the first melt forming a first elongated rope having a groove, the dough forming a second elongated rope that is cylindrical or twisted and has a length, the dough comprising a mechanical joint that protrudes from the second elongated rope along at least part of the length of the second elongated rope and is encased by the groove in the first melt while in the die assembly to fixedly attach the first elongated rope to the second elongated rope, the first and second elongated ropes respectively form the hard and soft components of the animal treat; and
adding an edible adhesive that is gelatin in an amount of 0.1 to 4.0 wt. % of the treat to at least one of the hard component or the soft component during manufacturing thereof, and the hard component is further fixedly attached to the corresponding mechanical joint on the soft component by the edible adhesive.

13. The method of claim 12 wherein the edible adhesive is added to at least the hard component.

14. The method of claim 12 wherein the edible adhesive is added to at least the soft component.

15. The method of claim 12 wherein the edible adhesive is 0.5 to 3.0 wt. % of the treat.

16. The method of claim 12 wherein the hard component has a twisted shape.

17. The method of claim 12 wherein the soft component is wrapped around the hard component in a spiral shape.

18. A multi-textured animal treat made according to the method of claim 12.

19. The multi-textured animal treat of claim 11 wherein the plurality of soft components comprises a first soft component and a second soft component, the mechanical joint of the first soft component is inserted into the hard component such that the mechanical joint of the first soft component is positioned interior to the groove and the rope of the first soft component is positioned exterior to the groove, the mechanical joint of the second soft component is inserted into the hard component such that the mechanical joint of the first soft component is positioned interior to an additional groove in the hard component and the rope of the second soft component is positioned exterior to an additional groove in the hard component, and the first soft component comprises at least one different ingredient relative to the second soft component.

20. The multi-textured animal treat of claim 1 wherein
the hard component comprises 8.0-20.0 wt. % of glycerin relative to the hard component and 4.0-15.0 wt. % of water relative to the hard component,
each of the one or more soft components comprises 15.0-25.0 wt. % of glycerin relative to the corresponding soft component and 4.0-15.0 wt. % of water relative to the corresponding soft component, and
the animal treat comprises 45.0-71.0 wt. % of pregelatinized starch relative to the animal treat, 8.0-18.0 wt. % of flour relative to the animal treat, and 8.0-15.0 wt. % of water relative to the animal treat.

* * * * *